(12) United States Patent
Lam et al.

(10) Patent No.: US 9,575,269 B2
(45) Date of Patent: Feb. 21, 2017

(54) ACTIVE OPTICAL CABLE ASSEMBLY

(71) Applicant: Intel Corporation, Santa Clara, CA (US)

(72) Inventors: Chun Chit Lam, San Jose, CA (US); Jamyuen Ko, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 596 days.

(21) Appl. No.: 13/846,302

(22) Filed: Mar. 18, 2013

(65) Prior Publication Data

US 2013/0259427 A1  Oct. 3, 2013

(30) Foreign Application Priority Data

Mar. 29, 2012  (WO) ............... PCT/US2012/031309

(51) Int. Cl.
*G02B 6/36* (2006.01)
*G02B 6/42* (2006.01)

(52) U.S. Cl.
CPC .......... *G02B 6/4293* (2013.01); *G02B 6/421* (2013.01); *G02B 6/4292* (2013.01); *G02B 6/423* (2013.01); *G02B 6/4214* (2013.01); *G02B 6/4243* (2013.01); *G02B 6/4249* (2013.01); *G02B 6/4284* (2013.01)

(58) Field of Classification Search
CPC .............................. G02B 6/4292; G02B 6/4293
See application file for complete search history.

(56) References Cited

U.S. PATENT DOCUMENTS

| | | | |
|---|---|---|---|
| 4,233,724 A | 11/1980 | Bowen et al. | |
| 5,535,296 A | 7/1996 | Uchida | |
| 2007/0237461 A1 | 10/2007 | Schempp | |
| 2008/0044140 A1 | 2/2008 | Wang et al. | |

(Continued)

FOREIGN PATENT DOCUMENTS

| | | | |
|---|---|---|---|
| DE | 4337905 A1 | 5/1994 | |
| TW | 201126216 A | 8/2011 | |

(Continued)

OTHER PUBLICATIONS

International Search Report and Written Opinion for PCT/US2012/031309 mailed Nov. 29, 2012, 6 pages.

(Continued)

*Primary Examiner* — Uyen Chau N Le
*Assistant Examiner* — Chad Smith
(74) *Attorney, Agent, or Firm* — Schwabe, Williamson & Wyatt, P.C.

(57) ABSTRACT

Described are embodiments of apparatuses and systems of an active optical cable assembly including a connector plug configured to resist stress to optical fibers of the cable assembly. The connector plug may include a light engine mounted on a substrate, a jumper mounted on the substrate and configured to convey optical signals between an optical fiber and the light engine, and a fiber holder assembly configured to constrain motion of the optical fiber, the fiber holder assembly including a fiber holder on a first side of the substrate and a fiber holder cover on a second side of the substrate such that the optical fiber is fixedly held between the fiber holder and the fiber holder cover. Other embodiments may be described and/or claimed.

15 Claims, 12 Drawing Sheets

(56) References Cited

U.S. PATENT DOCUMENTS

| | | | |
|---|---|---|---|
| 2008/0044143 A1* | 2/2008 | Wang et al. | 385/92 |
| 2008/0226228 A1 | 9/2008 | Tamura et al. | |
| 2008/0279560 A1* | 11/2008 | Osawa et al. | 398/130 |
| 2011/0031379 A1 | 2/2011 | Ishigami et al. | |
| 2011/0123150 A1 | 5/2011 | Zbinden et al. | |
| 2011/0123151 A1 | 5/2011 | Zbinden et al. | |
| 2011/0293221 A1 | 12/2011 | Kaneshiro et al. | |
| 2012/0002930 A1 | 1/2012 | Lin et al. | |

FOREIGN PATENT DOCUMENTS

| | | |
|---|---|---|
| TW | 201135473 A | 10/2011 |
| TW | M414684 U | 10/2011 |
| WO | 2011034544 A1 | 3/2011 |
| WO | 2011-044090 A2 | 4/2011 |

OTHER PUBLICATIONS

International Preliminary Report on Patentability for PCT Application No. PCT/US2012/031309, dated Oct. 9, 2014, 6 pages.

Taiwan Office Action and Search Report mailed Mar. 31, 2015, issued in corresponding Taiwan Patent Application No. 102108648, 16 pages.

Supplementary European Search Report mailed Oct. 11, 2015, issued in corresponding European Application No. 12872653.6, 7 pages.

Notice of Preliminary Rejection mailed Jan. 21, 2016, issued in corresponding Korean Patent Appln. No. 2014-7026940, 11 pages.

Office Action mailed Jun. 13, 2016 for Korean Patent Application No. 2014-7026940, 5 pages.

* cited by examiner

US 9,575,269 B2

ACTIVE OPTICAL CABLE ASSEMBLY

TECHNICAL FIELD

Embodiments of the invention relate generally to cable assemblies, and more particularly to active optical cable assemblies including a connector plug configured to resist stress to optical fibers of the cable assembly.

BACKGROUND

Current computer platform architecture design encompasses many different interfaces to connect one device to another device. The interfaces provide I/O (input/output) for computing devices and peripherals, and may use a variety of protocols and standards to provide the I/O. The differing interfaces may also use different hardware structures to provide the interface. For example, current computer systems typically include multiple ports with corresponding connection interfaces, as implemented by physical connectors and plugs at the ends of the cables connecting the devices. Common connector types may include a Universal Serial Bus (USB) subsystem with a number of associated USB plug interfaces, DisplayPort, High Definition Multimedia Interface (HDMI), Firewire (as set forth in IEEE 1394), or other connector type.

As computing devices grow smaller in size, the physical space requirements for the physical ports, as well as the printed circuit board (PCB, or PC board) requirements for the circuits to drive the ports, become more significant. Thus, providing all available interfaces, or even a significant number of them, may not be practical. Additionally, there may be certain interfaces (e.g., USB) that is extremely prevalent, but that does not have the bandwidth capacity of other interfaces (e.g., optical interfaces). All interfaces also face practical issues of usability and durability (peripheral devices may be plugged and unplugged many times), which can negatively affect the precision of alignment of a plug, reducing the effectiveness of the interface.

BRIEF DESCRIPTION OF THE DRAWINGS

Embodiments of the present disclosure will be described by way of example embodiments, but not limitations, illustrated in the accompanying drawings in which like references denote similar elements, and in which.

all in accordance with embodiments of the present disclosure.

DETAILED DESCRIPTION

Described herein are embodiments of an active optical cable assembly including a connector plug configured to resist stress to optical fibers of a cable of the cable assembly, and a system including the connector plug.

In the following description, numerous details are discussed to provide an explanation of various embodiments. It will be apparent to those skilled in the art, however, that embodiments of the present invention may be practiced without these specific details. In other instances, well-known structures and devices may be shown in block diagram form, rather than in detail, in order to avoid obscuring embodiments of the present invention.

Figure 1:
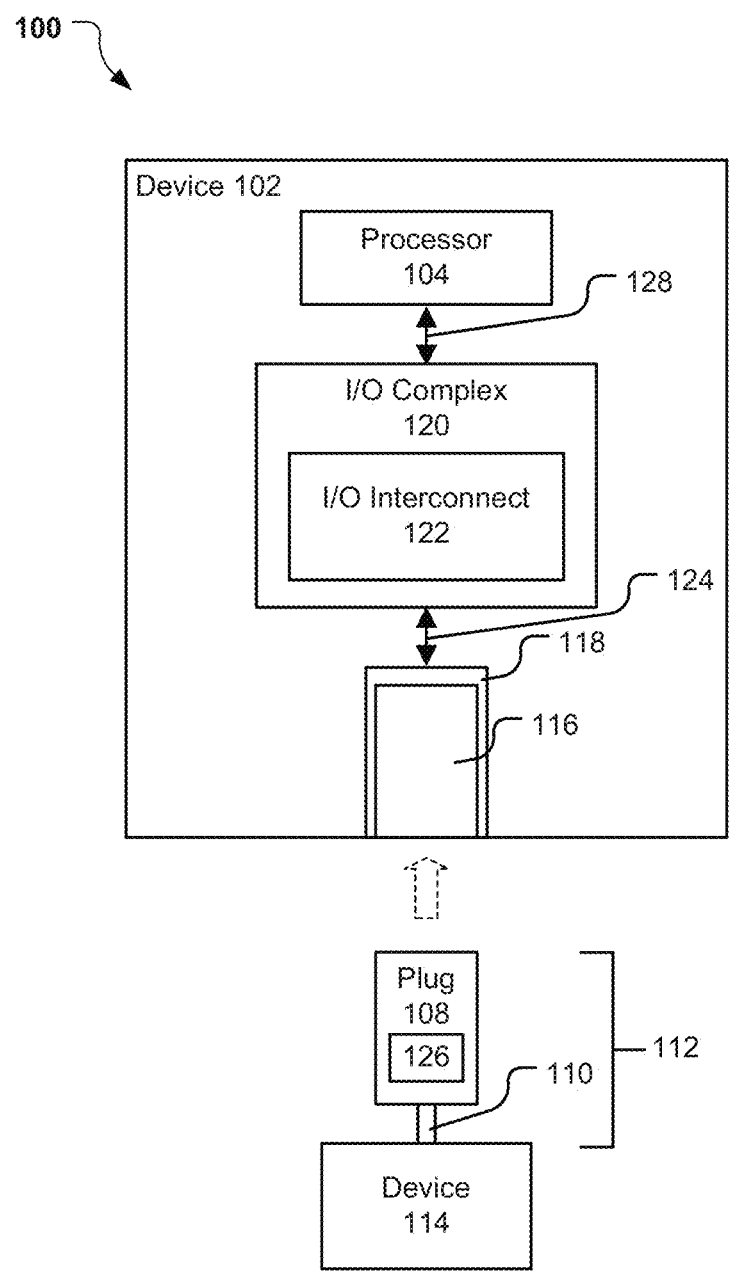
FIG. 1 is a block diagram of a system including an active optical cable assembly including a connector plug configured to resist stress to optical fibers of the cable assembly.

FIG. 1 is a block diagram of an embodiment of an optical interface. The system 100 includes device 102, which may be any of a number of computing devices, including, but not limited to, a desktop or laptop computer, a notebook, an ultrabook, a tablet, a netbook, or other such computing device. Besides computing devices, it will be understood that many other types of electronic devices may incorporate the one or more of the types of connector plug 108 and/or mating port 116 discussed herein, and the embodiments described herein would apply equally well in such electronic devices. Examples of other such electronic devices may include handheld devices, smartphones, media devices, personal digital assistants (PDA), ultra mobile personal computers, mobile phones, multimedia devices, memory devices, cameras, voice recorders, I/O devices, servers, set-top boxes, printers, scanners, monitors, entertainment control units, portable music players, digital video recorders, networking devices, gaming devices, gaming consoles, or any other electronic device that might include such a connector plug 108 and/or mating port 116. In further implementations, the device 102 may be any other electronic device that processes data.

The device 102 may include a processor 104, which may represent any type of processing component that processes electrical and/or optical signals I/O signals. The processor 104 is an abstraction, and it will be understood that a single processing device could be used, or multiple separate devices may be used. The processor 104 may include or be a microprocessor, programmable logic device or array, microcontroller, signal processor, or some combination.

The device 102 may include a port 116, which may be configured to interface with a connector plug 108. As described more fully herein, the connector plug 108 may be configured to resist stress from movement of a cable 110 of a cable assembly 112 including the connector plug 108. The connector plug 108 may be a connector plug configured to allow another device 114 to interconnect with the device 102. The connector plug 108 may support communication via an optical interface. In various embodiments, the connector plug 108 may also support communication via an electrical interface.

The device 114 may be a peripheral I/O device. In various embodiments, the device 114 may be any of a number of computing devices, including, but not limited to, a desktop or laptop computer, a notebook, an ultrabook, a tablet, a netbook, or other such computing device. Besides computing devices, it will be understood that device 114 may be any of many other types of electronic devices may incorporate the one or more of the types of connector plug 108 and/or mating port 116 discussed herein, and the embodiments described herein would apply equally well in such electronic devices. Examples of other such electronic devices may include handheld devices, smartphones, media devices, personal digital assistants (PDA), ultra mobile personal computers, mobile phones, multimedia devices, memory devices, cameras, voice recorders, I/O devices, servers, set-top boxes, printers, scanners, monitors, entertainment control units, portable music players, digital video recorders, networking devices, gaming devices, gaming consoles, or any other electronic device that might include such a connector plug 108 and/or mating port 116. In further implementations, the device 102 may be any other electronic device that processes data.

In some example implementations, device 102 may comprise a first server including a plurality of processors and device 114 may comprise a second server including a plurality of processors. In these implementations, the first server may be interconnected with the second server by the connector plug 108 and the mating port 116. In other example implementations, device 102 may comprise a set-top box and device 114 may comprise a television, or vice versa. Those skilled in the art will recognize that connector plug 108 and mating port 116 described herein may be included in any of numerous implementations.

The connector plug 108 may be configured to mate with the port 116 of the device 102. As used herein, mating one connector plug with another may refer to providing a mechanical connection. The mating of one connector plug with another typically also provides a communication connection. The port 116 may include a housing 118, which may provide the mechanical connection mechanisms. The port 116 may also include one or more optical interface components. The port 116 may be coupled with an I/O complex 120, including an I/O interconnect 122, via path 124. The path 124 may represent one or more components, which may include processing and/or termination components that convey an optical signal (or an optical signal and an electrical signal) between the processor 104 and the port 116. Conveying a signal may include the generation and converting to optical, or the receiving and converting to electrical, as described in more detail below.

In various implementations, instead of or in addition to the connector port 116, the device 102 may include a plug similar to the plug 108. Similarly, instead of or in addition to the plug 108, the device 114 may include a mating connector similar to connector port 116 for mating with the plug of the device 102.

The connector plug 108 may include a light engine 126 within the connector plug 108, and such a connector plug 108 may be referred to as an active optical connector or active optical receptacle and active optical plug. In general, such an active optical connector may be configured to provide the physical connection interface to a mating connector and an optical assembly. The optical assembly could also be referred to as a "subassembly." An assembly may refer to a finished product, or a finished system or subsystem of a manufactured item, while a subassembly generally may be combined with other components or another subassembly to complete a subassembly. A subassembly, however, is not distinguished from an "assembly" herein, and reference to an assembly may refer to what may otherwise be considered a subassembly.

The light engine 126 may comprise any device configured to generate optical signals and/or receive and process optical signals in accordance with the various operations described herein. In some implementations, the light engine 126 may include any one or more of a laser diode to generate optical signals, an optical integrated circuit (IC) to control optical interfacing of the connector plug 108, a photodiode to receive optical signals, etc. In some implementations, the optical IC may be configured to control the laser diode and the photodiode, drive the laser diode, and/or amplify optical signals from the photodiode. In various embodiments, the laser diode comprises a vertical-cavity surface-emitting laser (VCSEL).

In one embodiment, the light engine 126 may be configured to process the optical signals consistent with or in accordance with one or more communication protocols. For embodiments in which the connector plug 108 is configured to convey an optical signal and an electrical signal, it is not strictly necessary for the optical and electrical interfaces to operate according to the same protocol, but they may. Whether the light engine 126 processes signals in accordance with the protocol of the electrical I/O interface, or in accordance with a different protocol or standard, the light engine 126 may be configured or programmed for an intended protocol within a particular connector, and different light engines may be configured for different protocols. In one embodiment, the light engine 126 includes a laser diode to generate optical signals, a photodiode to receive optical signals, and an optical IC to control the laser diode and the photodiode. In various embodiments, the laser diode comprises a VCSEL.

In various embodiments, the I/O complex 120 may house one or more I/O interconnects 122 configured to control one or more I/O links that allow the processor 104 to communicate with the device 114, over path 128 and path 124, via the light engine 126 of the connector plug 108. In various embodiments, the I/O interconnect 122 may be configured to provide a capability of transporting data packets of one or more types of communication protocols.

In one embodiment, the photodiode, or a component with a photodiode circuit, may be considered an optical termination component, as the photo diode converts optical signals to electrical signals. The laser diode may be configured to convert electrical signals to optical signals. The optical IC may be configured to drive the laser diode based on a signal to be transmitted optically, by driving the laser diode with appropriate voltages to generate an output to produce the optical signal. The optical IC may be configured to amplify signals from the photodiode. The optical IC may be configured to receive the electrical signals generated by the photodiode and process them for interpretation. In one embodiment, the optical IC may be configured to perform power management to turn off optical components (e.g., lasers, photodiodes) when not in use.

Various communication protocols or standards may be used for embodiments described herein. Communication protocols may include, but are not limited to, mini DisplayPort, standard DisplayPort, mini universal serial bus (USB), standard USB, PCI express (PCIe), or high-definition multimedia interface (HDMI). It will be understood that each different standard may include a different configuration or pinout for the electrical contact assembly. Additionally, the size, shape and configuration of the connector may be dependent on the standard, including tolerances for the mating of the corresponding connectors. Thus, the layout of the connector to integrate the optical I/O assembly may be different for the various standards. As will be understood by those of skill in the art, optical interfaces require line-of-sight connections to have an optical signal transmitter interface with a receiver (both may be referred to as lenses). Thus, the configuration of the connector will be such that the lenses are not obstructed by the corresponding electrical contact assemblies if present. For example, optical interface lenses can be positioned to the sides of the contact assemblies, or above or below, depending on where space is available within the connector.

Figure 2:
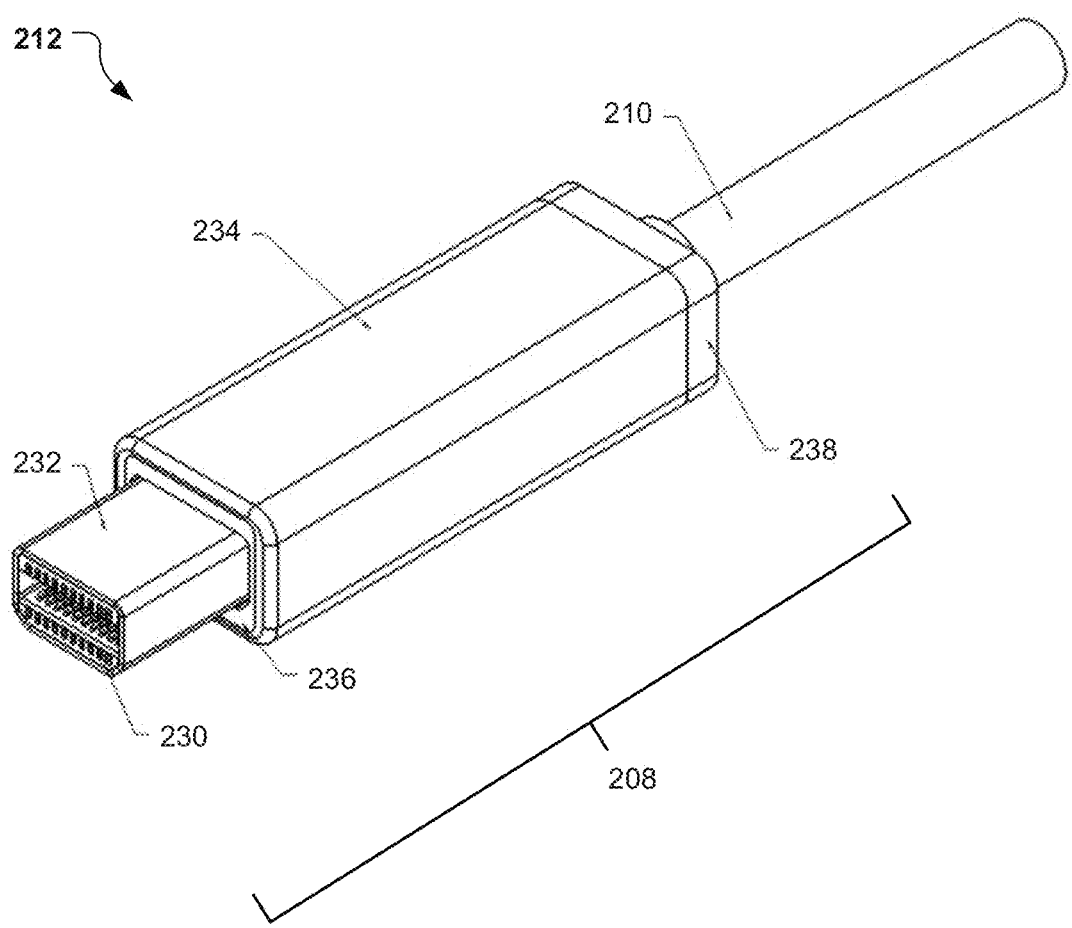
FIG. 2 is a perspective view of an active optical cable assembly including a connector plug configured to resist stress to optical fibers of the cable assembly.

FIG. 2 describes an embodiment of an optical cable assembly 212. As shown in FIG. 2, the optical cable assembly 212 includes a connector plug 208 coupled with a cable 210. The connector plug 208 may include a light engine (such as the light 126 illustrated in FIG. 1) incorporated into the connector plug 208 for providing an optical interface. While the specific example illustrated is a mini DisplayPort (mDP) connector, it will be understood that other connector types can be equally constructed as described herein. Thus, optical communication through a standard connector can be implemented in an active way by fitting optical circuitry and optical components, or electro-optical circuitry and components, into the connector plug 208 as illustrated in the optical cable assembly 212.

The connector plug 208 may include a plug housing 230 and a metal housing 232. The metal housing 232 may be configured to provide mechanical interfacing and ground the connector plug 208. More particularly, metal housing 232 may be configured to provide positional rigidity for the plug housing 230, and EMI (electromagnetic interference) shielding when the connector plug 208 is mated with a corresponding plug. The plug housing 230 may be configured to provide additional mechanical interfacing structure and a structure or mechanical framework in which to incorporate the I/O interfaces. The connector plug 208 may further include a boot 234, a boot cover 236, and an end tube 238 coupled with the boot 234.

Figure 3:
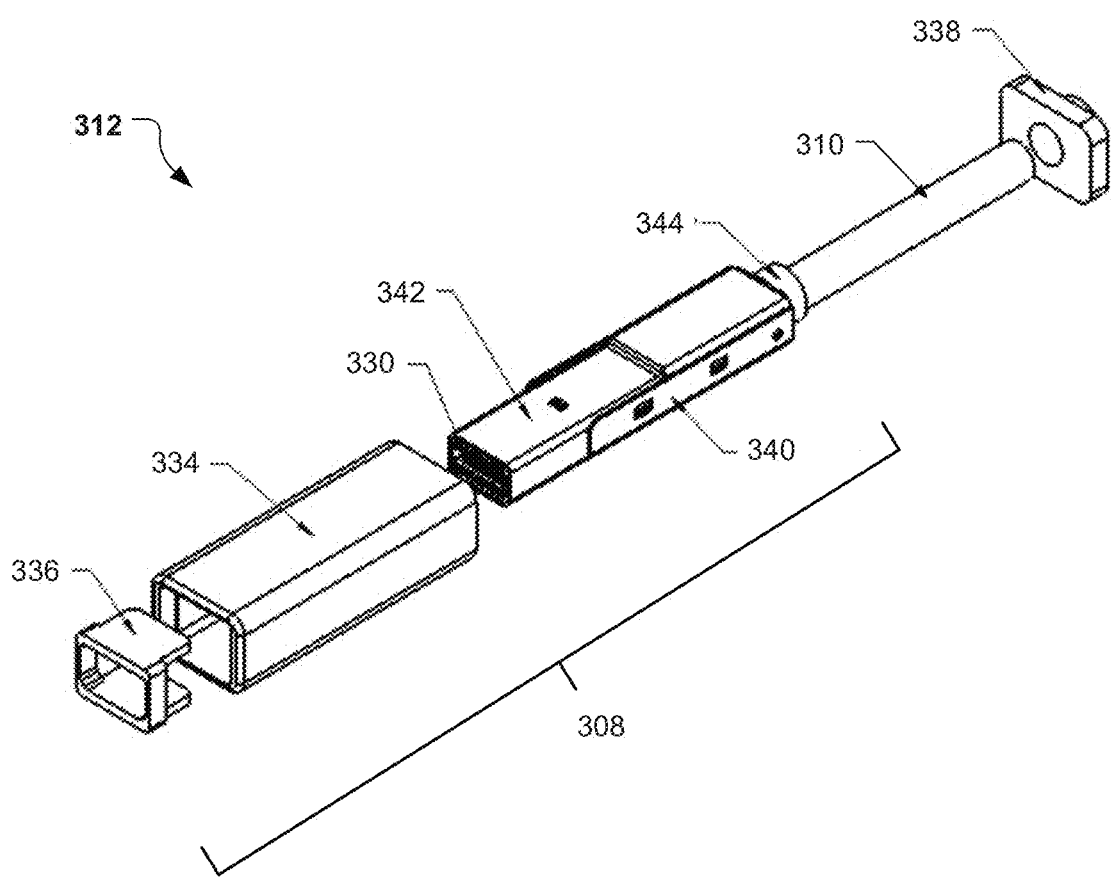
FIG. 3 is an exploded view of an active optical cable assembly including a connector plug configured to resist stress to optical fibers of the cable assembly.

FIG. 3 is an exploded view of an embodiment of an optical cable assembly 312. The optical cable assembly 312 (i.e., the completed assembly of components shown in FIG. 3) may represent one example of an optical cable assembly having an active light engine. While the specific example illustrated is an mDP connector, it will be understood that other connector types can be equally constructed as described herein. Thus, optical communication through a standard connector can be implemented in an active way by fitting optical circuitry and components, or electro-optical circuitry and components, into the connector plug 308.

The optical cable assembly 312 may include one or more components similar to those of other embodiments of optical cable assemblies described herein. The connector plug 308 of the optical cable assembly 312 may include, for example, one or more of a plug housing 330, a boot 334, a boot cover 336, an end tube 338, and a cable 310. The optical cable assembly 312 may include a plug cap 344 for facilitating coupling of the cable 310 with the connector plug 308.

As shown, the boot 334 and the boot cover 336 of the connector plug 308 may be configured to at least partially enclose a top shield 340 and a bottom shield 342, and various components of the connector plug 308. The top shield 340 and the bottom shield 342 may be configured to provide rigidity for the connector plug 308, as well as EMI shielding when the connector plug 308 is mated. In various embodiments, the connector plug 308 may include a unitary shield rather than separate top shield 340 and bottom shield 342.

Figure 4:
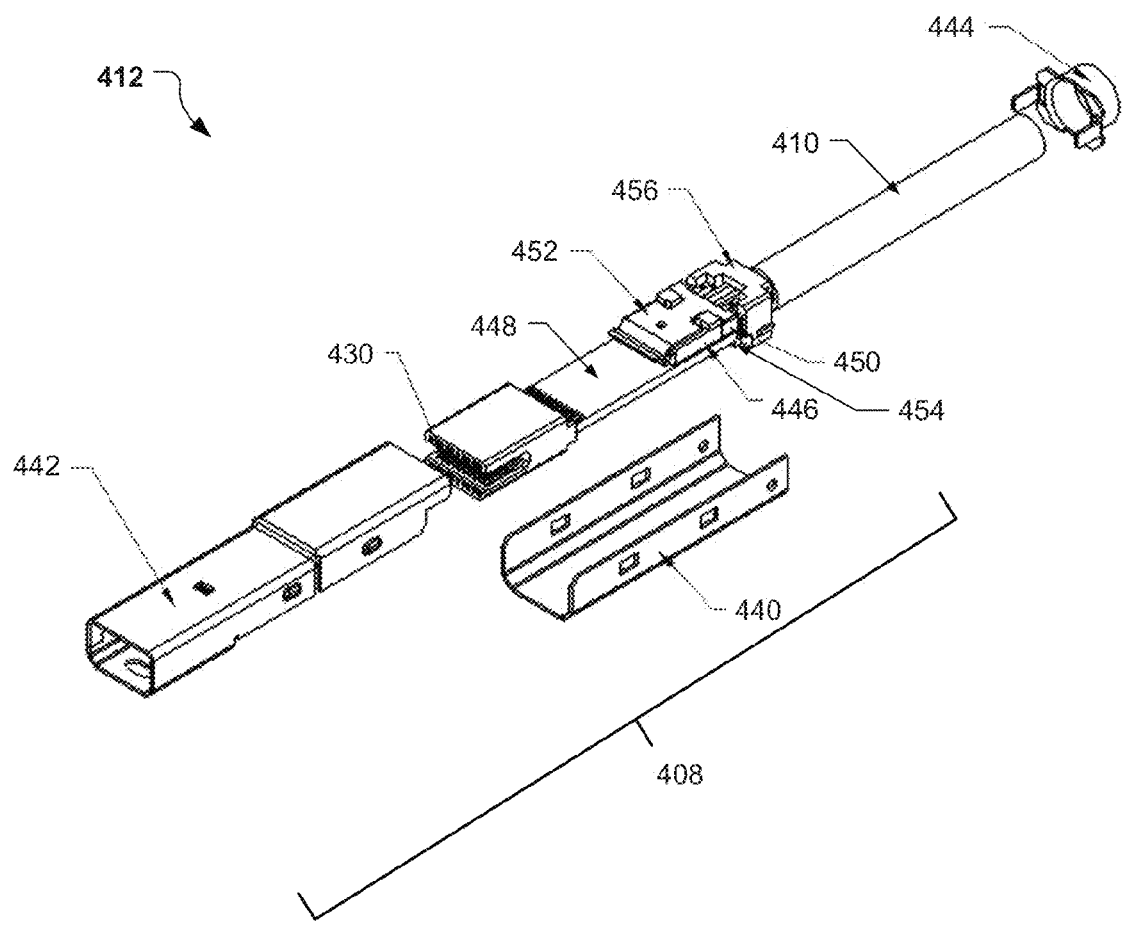
FIG. 4 is an exploded view of an active optical cable assembly including a connector plug configured to resist stress to optical fibers of the cable assembly.

FIG. 4 is an exploded view of an embodiment of an optical cable assembly 412. The optical cable assembly 412 (i.e., the completed assembly of components shown in FIG. 4) may represent one example of an optical cable assembly having an active light engine. While the specific example illustrated is an mDP connector, it will be understood that other connector types can be equally constructed as described herein. Thus, optical communication through a standard connector can be implemented in an active way by fitting optical circuitry and components, or electro-optical circuitry and components, into the connector plug 408.

The optical cable assembly 412 may include one or more components similar to those of other embodiments of optical cable assemblies described herein. The connector plug 408 of the optical cable assembly 412 may include, for example, one or more of a plug housing 430, a cable 410, a plug cap 444, a top shield 440, and a bottom shield 442.

Within the top shield 440 and the bottom shield 442, the connector plug 408 may include a lens 446 for providing, at least in part, optical interfacing for the optical cable assembly 412. In various embodiments, the lens 446 comprises a lens body with one or more optical surfaces and one or more total-internal-reflection (TIR) surfaces. The lens 446 may be configured to expand an optical beam on transmit to facilitate optical communication. In an expanded-beam optical interfacing approach, the lens 446 may expand and collimate transmit signals, and focus receive signals. As understood by those of skill in the art, collimating may refer to making the photons of the light signal more parallel in reception.

The lens 446 may be mounted on a substrate 448 and constructed of any appropriate material, which may include plastic, glass, silicon, or other material or materials that can be shaped and that can provide optical focusing. In various embodiments, plastic lenses may provide convenience in cost, manufacturing, and durability. In various embodiments, suitable materials for the substrate 448 may include, but are not limited to, a printed circuit board, a flex-board, or a lead frame. The printed circuit board may comprise any suitable material include a laminate (e. cladded with any suitable conductor (e.g., copper-clad laminate, etc.).

The connector plug 408 may include a jumper 450 configured to facilitate conveyance of optical signals between optical fibers (within the cable jacket of the cable 410, shown in more detail later) and a light engine mounted on the substrate 448. A latch 452 may be configured to secure engagement between the jumper 450 and the lens 446. The jumper 450 may be fixed to the optical fibers of the cable 410 using glue or another suitable adhesive. In various embodiments, the jumper 450 may be part of a jumper assembly including a fiber holder 454 and a fiber holder cover 456 for capturing and aligning the optical fibers.

Figure 5:
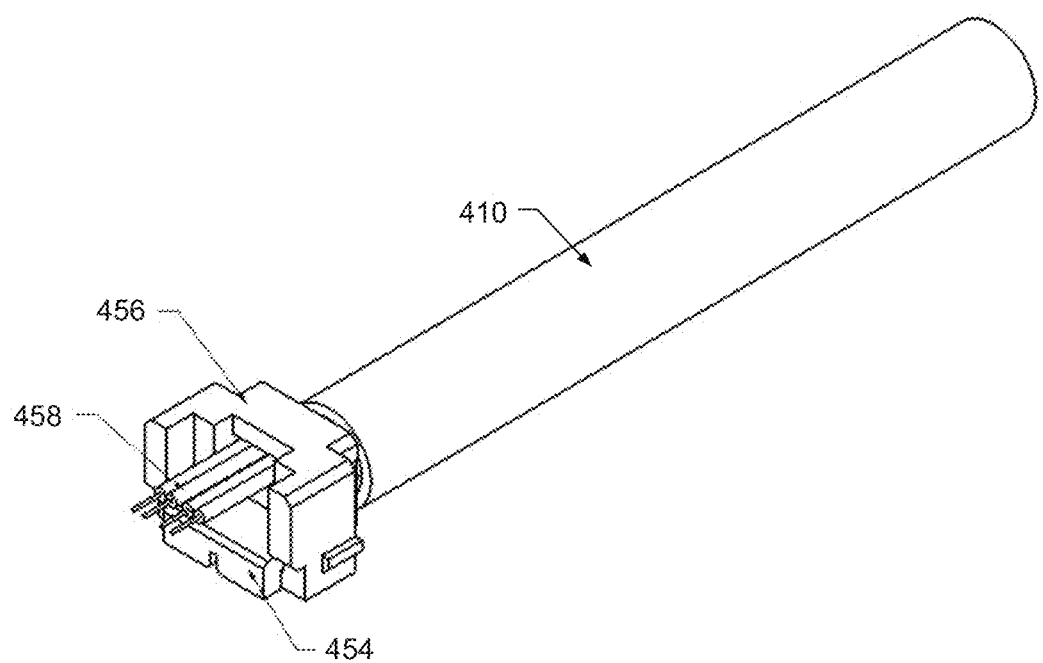
FIG. 5 is a perspective view of a portion of an active optical cable assembly including a connector plug configured to resist stress to optical fibers of the cable assembly.

A more detailed view of the fiber holder 454, the fiber holder cover 456, and the optical fibers 458 is shown in FIG. 5. As can be seen, the fiber holder 454 and the fiber holder cover 456 are configured to compress the optical fibers 458. In this manner, the fiber holder 454 and the fiber holder cover 456 may operate to constrain the motion of the optical fibers 458 inside the connector plug 408. By constraining the motion of the optical fibers 458, the fiber holder 454 and the fiber holder cover 456 may resist stress to the optical fibers 458 due to movement of the cable 410 (or relative movement of the connector plug 408 and the cable 410). By protecting the optical fibers 458 from movement stress, impact to the integrity the optical fibers 458 may be minimized relative to conventional optical cable solutions. In various embodiments, constraining the motion of the optical fibers 458 may resist transference of motion of the cable 410 to the jumper 450, which may also be advantageous in avoiding disruption to the optical signals. The two-piece design of the fiber holder 454 and the fiber holder cover 456 also provides support to the bottom of the substrate 448 and may help fix the end of the substrate 448 within the other components (e.g., the top shield 440 and bottom shield 442) of the connector plug 408.

Figure 6:
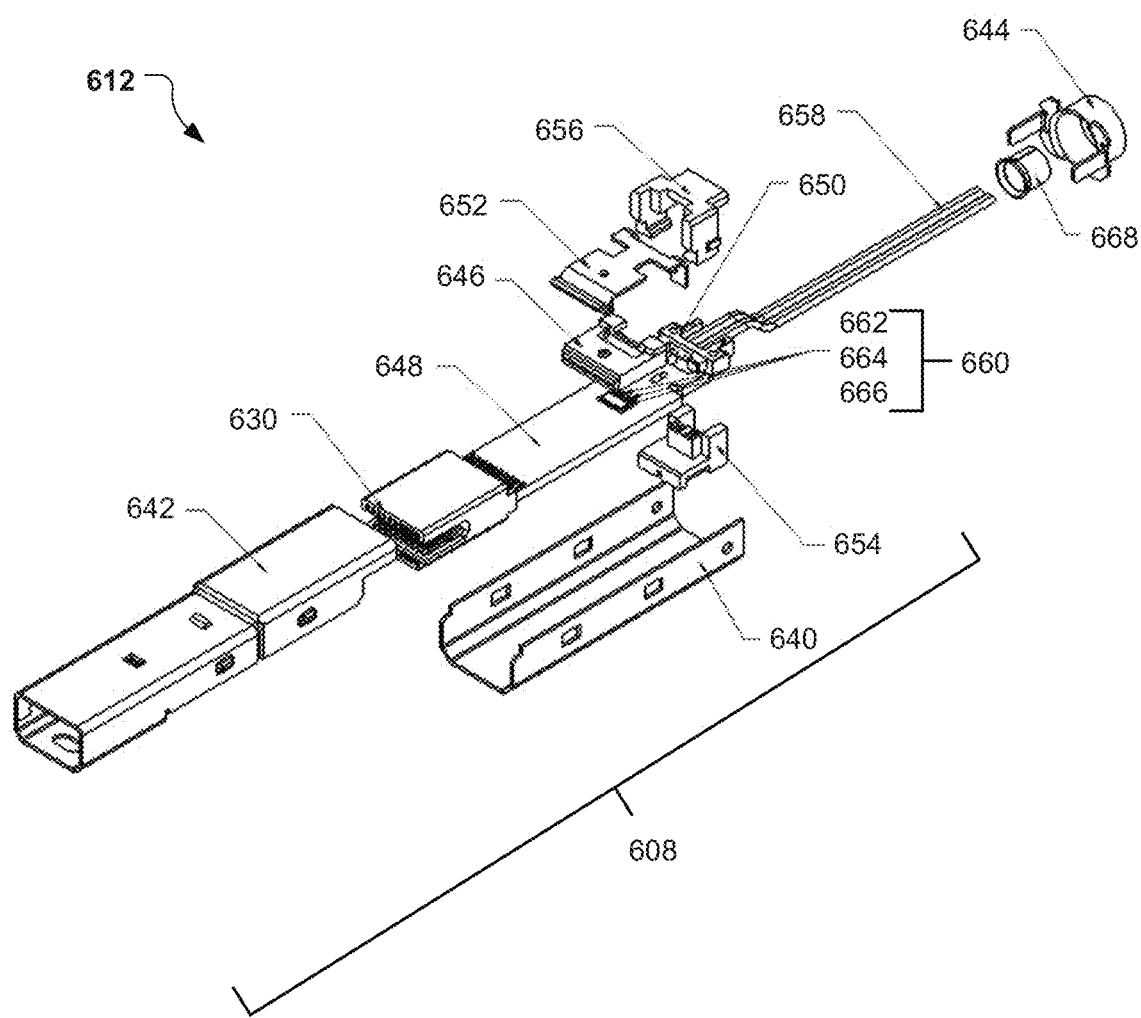
FIG. 6 is an exploded view of an active optical cable assembly including a connector plug configured to resist stress to optical fibers of the cable assembly.

FIG. 6 is an exploded view of an embodiment of an optical cable assembly 612. The optical cable assembly 612 (i.e., the completed assembly of components shown in FIG. 6) may represent one example of an optical cable assembly having an active light engine. While the specific example illustrated is an mDP connector, it will be understood that other connector types can be equally constructed as described herein. Thus, optical communication through a standard connector can be implemented in an active way by fitting optical circuitry and components, or electro-optical circuitry and components, into the connector plug 608.

The optical cable assembly 612 may include one or more components similar to those of other embodiments of optical cable assemblies described herein. The connector plug 608 of the optical cable assembly 612 may include, for example, one or more of a plug housing 630, a plug cap 644, a top shield 640, a bottom shield 642, a substrate 648, a lens 646, a latch 652, a jumper 650, a fiber holder 654, a fiber holder cover 656, and optical fibers 658.

As in other embodiments described herein, the connector plug 608 may include an active light engine 660 configured to actively generate and/or receive, and process optical signals. The light engine 660 may include a laser diode 662 to generate optical signals, an optical IC 664 to control optical interface, and a photodiode 666 to receive optical signals. In various embodiments, the optical IC 664 may be configured to control the laser diode 662 and the photodiode 666. In various embodiments, the optical IC 664 may be configured to drive the laser diode 662 and amplify optical signals from the photodiode 666. In various embodiments, the laser diode 662 comprises a VCSEL. Various components of the light engine 660 may be mounted onto the substrate 648.

The light engine 660 may be configured or programmed for a particular communication protocol, or may be configured or programmed for various different communication protocols. In various embodiments the light engine 660 may include different light engines configured for different protocols.

In various embodiments, the lens 646 may be configured to focus received light onto a receive component of the light engine 660 (e.g., a photodiode 666), and expand light from a transmit component of the light engine 660 (e.g., a laser diode 662). The connector plug 608 may be configured to support one or multiple optical channels. For embodiments including multiple optical channels, the connector plug 608 may include additional lenses for transmit and receive, and corresponding transmit and receive components of the light engine 660.

In various embodiments, the photodiode 666, or a component with a photodiode circuit may be considered an optical termination component in that the photodiode may be configured to convert optical signals to electrical signals. The laser diode 662 may be configured to convert electrical signals to optical signals. The optical IC 664 may be configured to drive the laser diode 662 based on a signal to be transmitted optically, by driving the laser with appropriate voltages to generate an output to produce the optical signal. The optical IC 664 may be configured to receive the electrical signals generated by the photodiode 666 and process them for interpretation. In one embodiment, the optical IC 664 may be configured to perform power management to turn off one or more optical components (e.g., laser diodes, photodiodes, etc.) when not in use.

As with various embodiments described herein, the jumper 650 may be part of a jumper assembly including the fiber holder 654 and the fiber holder cover 656 for capturing and aligning the optical fibers 658. As will be understood by those skilled in the art, an advantage of the jumper assembly as illustrated in FIG. 6 (as well as in FIG. 4 and FIG. 5) is that the lens 646 and optical fibers 658 may be installable after solder processing. Electrical components may be installed or attached to the substrate 648 via solder, which may include a reflow process. While different processing technologies are known, one common method is for a pick-and-place machine or equivalent to adhere (e.g., through a paste or glue, such as a solder paste) components in place, and place a solder paste at the electrical connections. The entire substrate 648 with all installed components may then be exposed to heat or infrared (IR) to melt the solder paste (which typically includes solder flux), which solders the component leads to the trace contacts on the substrate 648 or creates solder joints. The process may involve heat that is damaging to plastic components. Thus, installing the optical fibers 658 and/or other plastic components post-solder-processing may avoid damage to the optical fibers 658 and/or other plastic components.

Figure 7A:
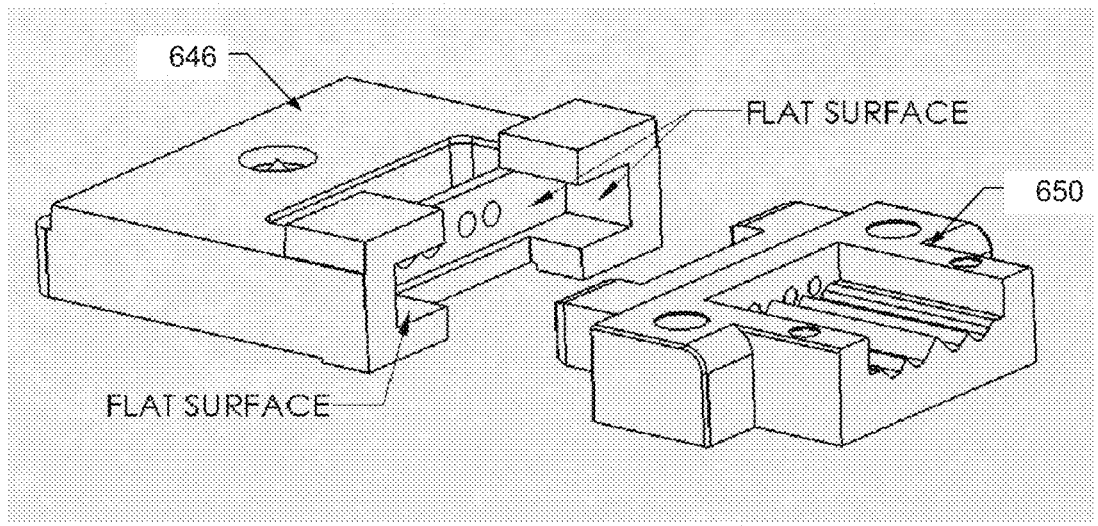
FIG. 7A and FIG. 7B show perspective views of the lens and the jumper of the active optical cable assembly of FIG. 6.
Figure 7B:
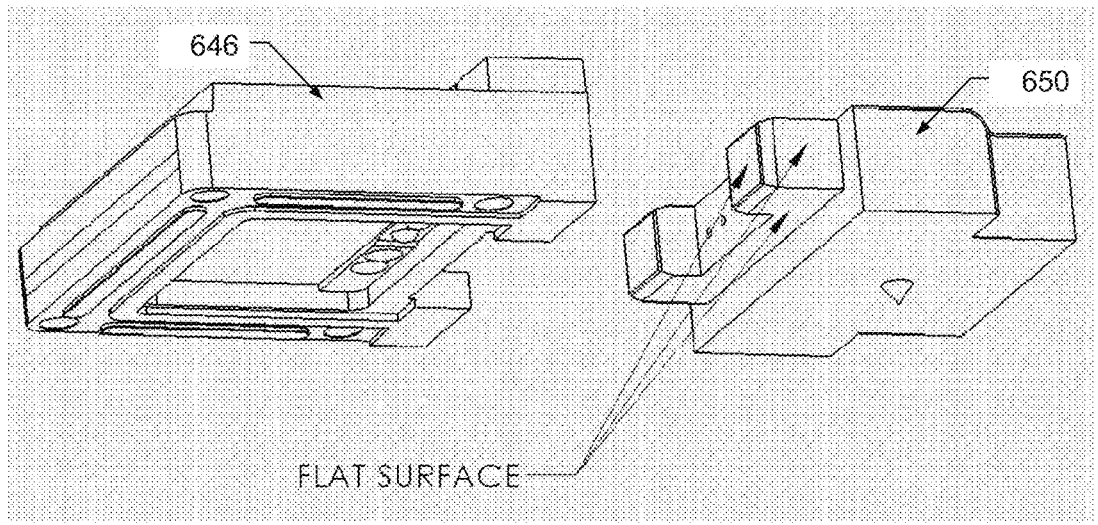

Another advantage to the jumper assembly as illustrated is the passive alignment of optical components. Rather than requiring shining a light through an optical fiber 658 and ensuring (e.g., manually) the alignment of each component prior to setting the components (e.g., via glue), the engaging of the lens assembly 646 with the jumper 450, and secured by the latch 652 may act to passively align various components of the connector plug 608 due at least in part to the molded, flat surfaces of the lens 646 and the jumper 450 as can be seen in FIG. 6, and more clearly in FIG. 7A and FIG. 7B.

Figure 8:
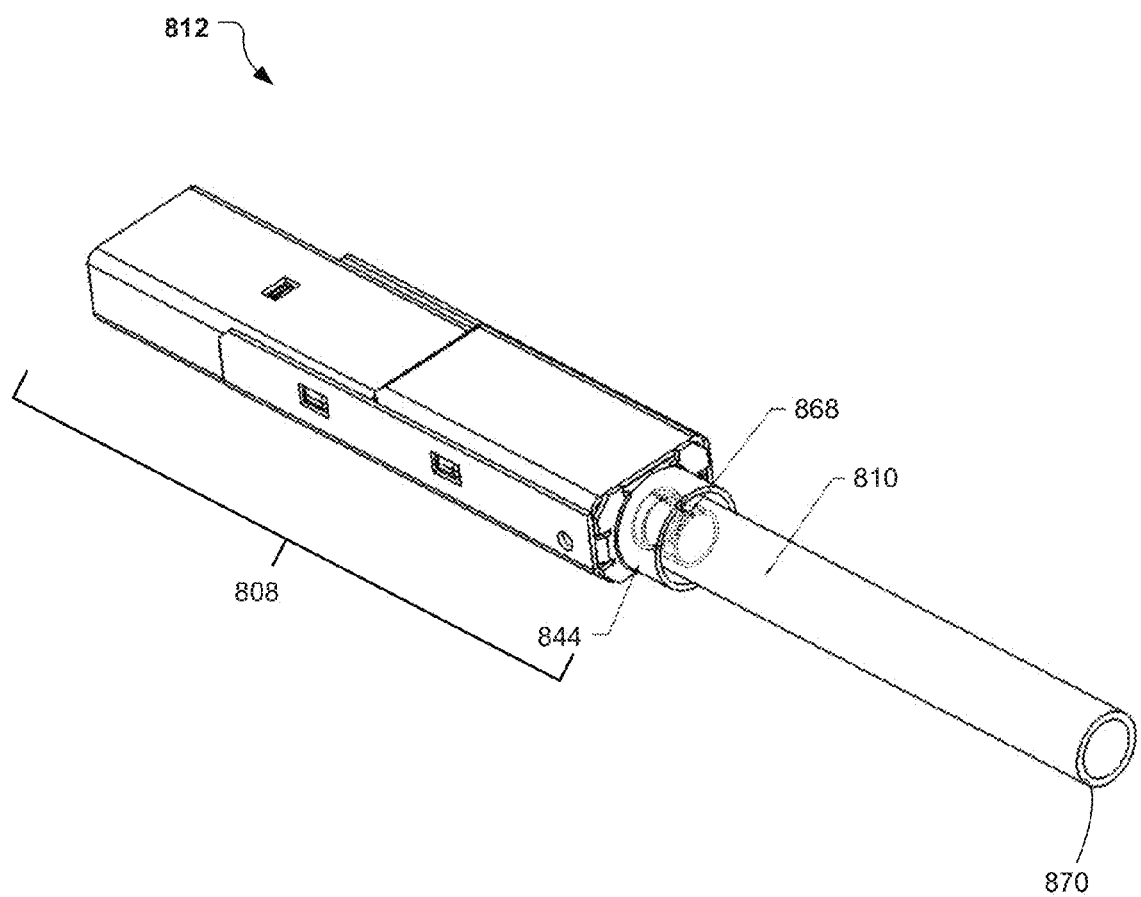
FIG. 8 is a perspective view of an active optical cable assembly including a connector plug configured to resist stress to optical fibers of the cable assembly.
Figure 9:
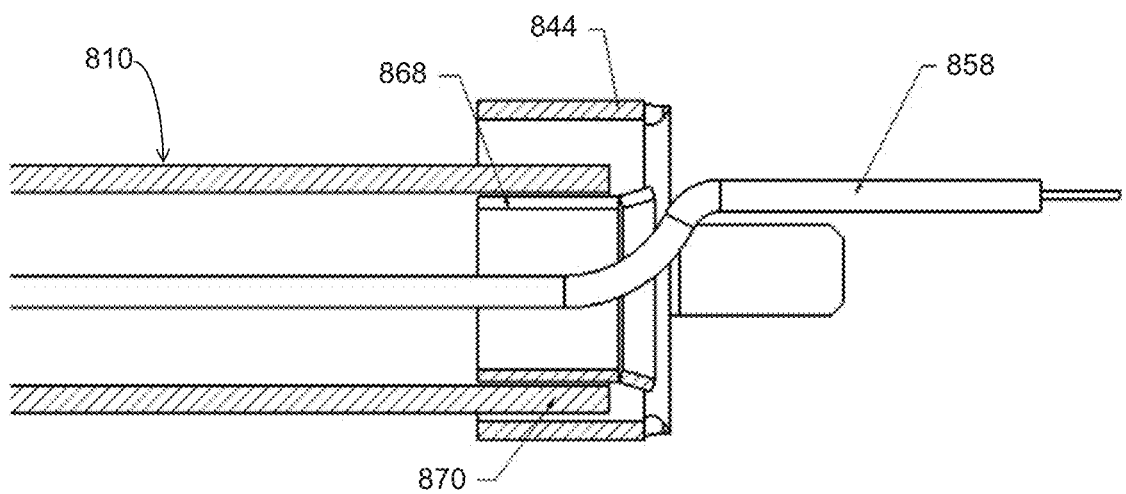
FIG. 9 is a sectional view of the active optical cable assembly of FIG. 8.
Figure 10:
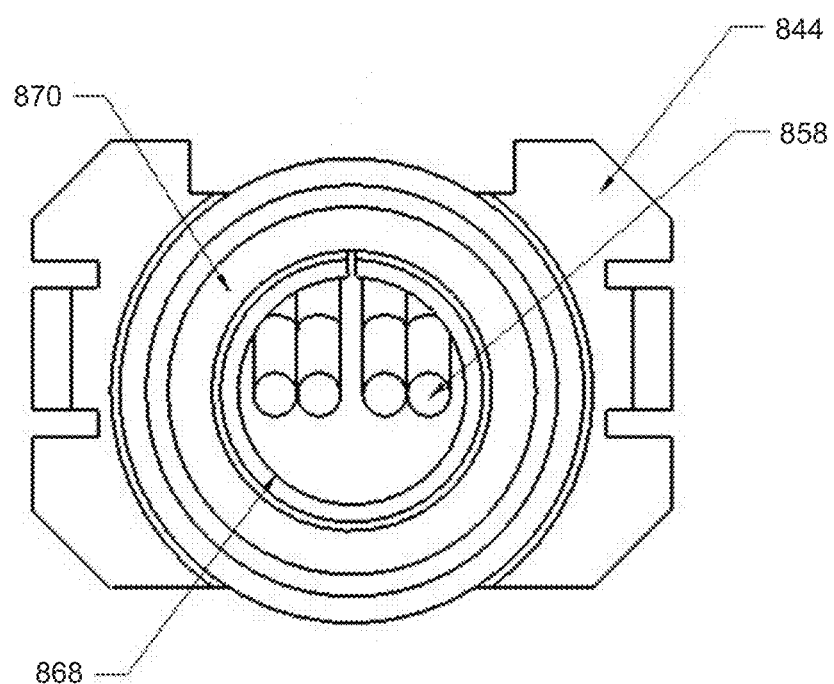
FIG. 10 is another sectional view of the active optical cable assembly of FIG. 8.

Referring again to FIG. 6, in various embodiments, the optical cable assembly 612 may include a plug cap 644 and jacket support 668 cooperatively configured to resist stress to the optical fibers 658 from movement of the cable, as shown in more detail in the embodiments described with reference to FIG. 8, FIG. 9, and FIG. 10. A perspective view of an optical cable assembly 812 is shown in FIG. 8. The optical cable assembly 812 (i.e., the completed assembly of components shown in FIG. 8) may represent one example of an optical cable assembly having an active light engine.

As shown in FIG. 8, the plug cap 844 may be configured to facilitate coupling of the cable 810 with the connector plug 808. A jacket support tube 868 may be configured to nest within a cable jacket 870 of the cable 810, which can seen more clearly in FIG. 9 and FIG. 10. As shown, the jacket support tube 868 is configured to have an end nested within an end of the cable jacket 870. The circular end of the plug cap 844 may fit over the jacket support tube 868 and end of the cable jacket 870, as shown, and may be crimped or otherwise pressed against the end of the cable jacket 870. To illustrate this concept, the upper portion of the plug cap 844 is shown in a starting position, while the bottom portion of the plug cap 844 is shown in the crimped position in which the cable jacket 870 is pressed between the jacket support tube 868 and the plug cap 844. By fixing just the cable jacket between the plug cap 844 and the jacket support tube 868, pressure on the optical fibers 858 may be minimized relative to conventional joining methods, which may help protect the integrity of the optical fibers 858.

In various embodiments, the jacket support tube 868 may have a first end having a diameter sized to fit within the end of the cable jacket 870 (i.e., no greater than a diameter of the interior of the end of the cable jacket 870) and a second end having a diameter greater than the diameter of the interior of the cable jacket 870. As such, the second end of the jacket support tube 868 protrudes from the end of the cable jacket 870. This configuration may help keep the jacket support tube 868 on the open end of the cable jacket 870.

Figure 11A:
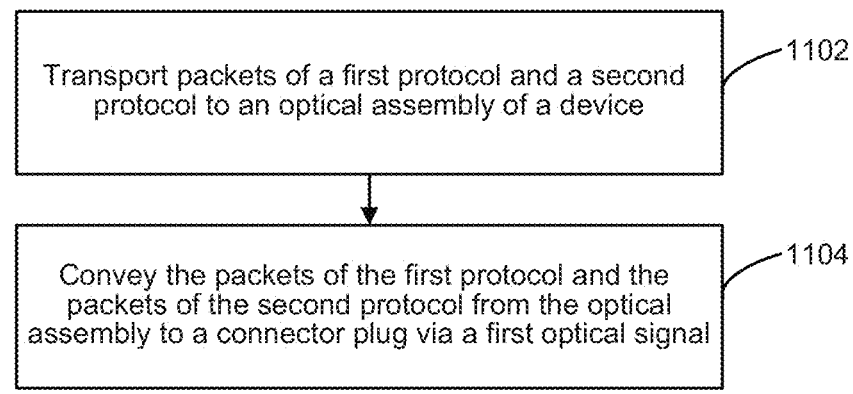
FIGS. 11A, 11B, and 11C are flow charts of methods of transmitting and/or receiving optical signals using an active optical cable assembly.
Figure 11B:
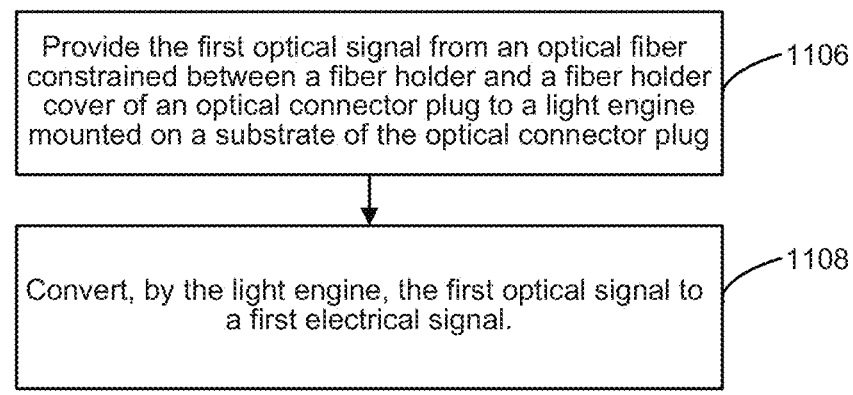
Figure 11C:
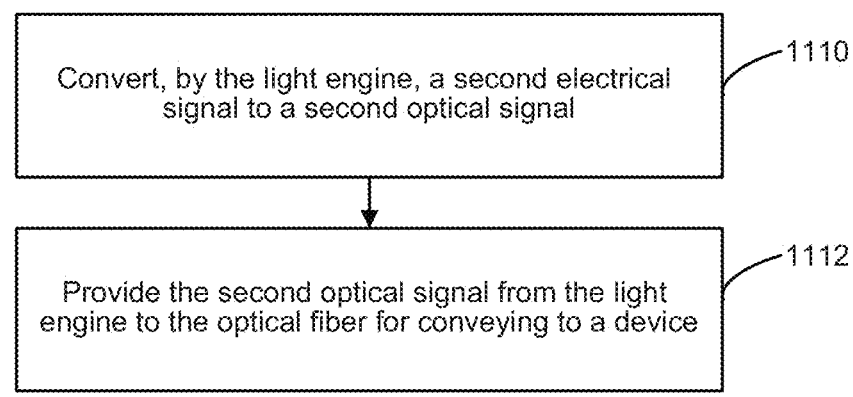

FIGS. 11A, 11B, and 11C are flow diagrams of some of the operations associated with methods for transmitting and/or receiving optical signals by an active optical cable assembly and/or a connector plug described herein, in accordance with various embodiments. The methods may include one or more functions, operations, or actions as is illustrated by block 1102, 1104, 1106, 1108, 1110, and/or 1112.

Processing for an embodiment of a method as shown in FIG. 11A may start with block 1102 by transporting packets of a first protocol and packets of a second protocol to an optical assembly of a first device. The transporting may be performed by an I/O interconnect structure described herein, and the first device may be coupled to an active optical cable assembly described herein. In various embodiments, the first device may be a host device that includes the active optical cable assembly for coupling with another device. In various embodiments, the first protocol and the second protocol are different communication protocols. For example, in one embodiment, the first protocol may be DisplayPort and the second protocol may be PCIe. Other protocols and combinations of protocols are possible. In some embodiments, the first protocol and the second protocol are the same protocol.

The method may proceed to block 1104 by conveying the packets of the first protocol and the packets of the second protocol from the optical assembly to an optical connector plug of an active optical cable assembly via a first optical signal. In various embodiments, the first optical signal may be conveyed over one or more optical fibers.

In FIG. 11B, at block 1106, the first optical signal can be provided from the optical fiber to a light engine of the optical connector plug of the active optical cable assembly. In various embodiments, the light engine may be mounted on a substrate of the optical connector plug. In various embodiments, the optical fiber may be constrained between a fiber holder and a fiber holder cover of the optical connector plug, which may help resist stress to the optical fiber due to movement of the cable of the active optical cable assembly.

At block 1108, the light engine may convert the first optical signal to a first electrical signal. In various embodiments, the first electrical signal may be provided to a second device into which the optical connector plug is plugged. In various embodiments, the converting of the first optical signal to the first electrical signal may be performed by a photodiode of the light engine. In various embodiments, the method may include controlling the photodiode by an optical IC of the light engine.

In FIG. 11C, at block 1110, the light engine may convert a second electrical signal to a second optical signal. In various embodiments, the second electrical signal may be received by the optical connector plug from the second device into which the optical connector plug is plugged. In various embodiments, the electrical signal may configured to transport packets of a first protocol and packets of a second protocol, which may be provided to the active optical cable assembly from an I/O interconnect structure of the second device. In various embodiments, the first protocol and the second protocol are different communication protocols or the same protocol. In various embodiments, the converting of the first optical signal to the first electrical signal may be performed by a laser diode of the light engine. In various embodiments, the method may include controlling the laser diode by an optical IC of the light engine.

At block 1112, the light engine may provide the second optical signal to the optical fiber for conveying to the first device coupled with the optical fiber.

In various embodiments, the method of FIG. 11A, 11B, or 11C can be performed by executing machine-readable instructions by a processor, wherein the machine-readable instructions are stored on a machine-readable storage medium (e.g., a flash memory, a dynamic random access memory, a static random access memory, etc.) coupled to the processor.

Figure 12:
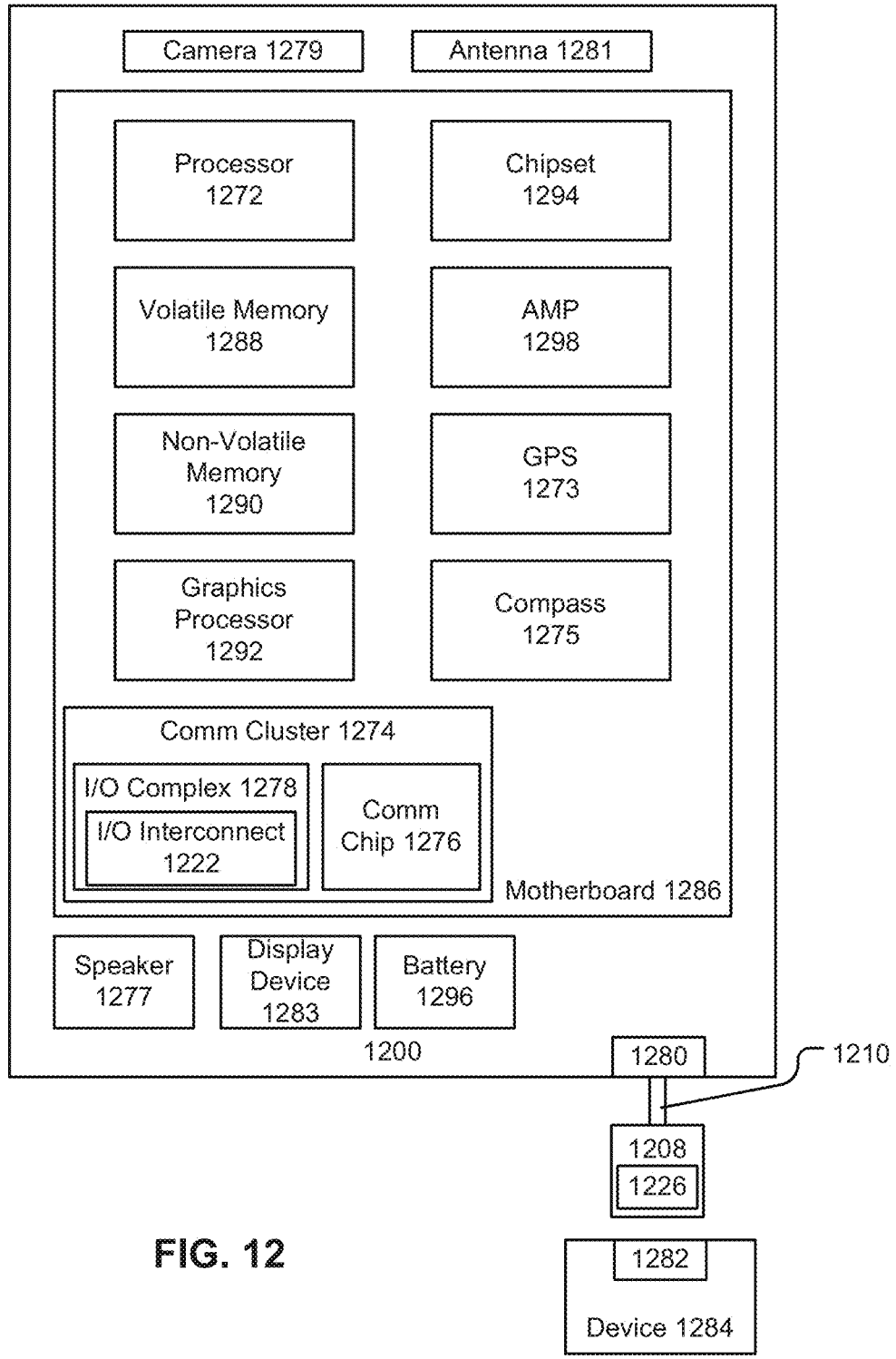
FIG. 12 is a block diagram of a system incorporating one or more active optical cable assemblies.

Embodiments of the active optical cable assemblies and/or connector plugs described herein may be incorporated into various other apparatuses and systems including, but not limited to, various computing and/or consumer electronic devices/appliances. A system level block diagram of an example system 1200 is illustrated in FIG. 12. In various embodiments, the system 1200 may include more or fewer components, and/or different architectures than that shown in FIG. 12.

In various implementations, the system 1200 may be a laptop, a netbook, a notebook, an ultrabook, a smartphone, a tablet, a personal digital assistant (PDA), an ultra mobile personal computer, a mobile phone, a desktop computer, a server, a printer, a scanner, a monitor, a set-top box, an entertainment control unit, a digital camera, a portable music player, or a digital video recorder. In further implementations, the system 1200 may be any other electronic device that processes data.

The processor 1272 of the system 1200 may include an integrated circuit die packaged within the processor 1272. In some implementations, the integrated circuit die of the processor 1272 may include one or more devices, such as transistors or metal interconnects. The term "processor" may refer to any device or portion of a device that processes electronic data from registers and/or memory to transform that electronic data into other electronic data that may be stored in registers and/or memory.

The system 1200 may include a communications cluster 1274 operatively to facilitate communication of the system 1200 over one or more networks and/or with any other suitable device. The communications cluster 1274 may include at least one communication chip 1276 and at least one I/O complex 1278. In some implementations, the at least one I/O complex 1278 may be part of the at least one communication chip 1276. In some implementations the at least one communication chip 1276 may be part of the processor 1272. In some implementations, the I/O complex 1278 may include an I/O controller. The communication chip 1276 may include an integrated circuit die packaged within the communication chip 1276. The I/O complex 1278 may include an integrated circuit die packaged within the I/O complex 1278.

The communication chip 1276 may enable wireless communications for the transfer of data to and from the system 1200. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1276 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 2G, 3G, 4G, 5G, and beyond. The system 1200 may include a plurality of communication chips 1226. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The active optical cable assemblies and/or connector plugs described herein may be included in one or more of the elements of the system 1200. As shown, an optical cable assembly including an optical connector plug 1208 having a light engine 1226 may be coupled with an optical assembly 1280 the system 1200 by an optical cable 1210. The optical cable 1210 may include one or more optical fibers. The optical assembly 1280 may be configured to provide an optical I/O interface and to actively generate and receive optical signals. In various embodiments, the optical assembly 1280 may be operatively coupled with the I/O interconnect 1222. The optical connector plug 1208 may be configured to mate with a mating port 1282 of an external device 1284.

In some implementations, the I/O complex 1278 may include an I/O interconnect 1222, which may be similar to the I/O interconnect described in FIG. 1. The I/O interconnect 1222 may be configured to control one or more I/O links that allow the processor 1272 to communicate with the external device 1284 via the optical fiber of the optical cable 1210 and the light engine 1226 of the connector plug 1208. In various embodiments, the I/O interconnect 1222 may be configured to transport data packets of different communication protocols.

In various embodiments, the system 1200 may house a motherboard 1286 with which the processor 1272 and/or the communications cluster 1274 may be physically and electrically coupled.

Depending on its applications, the system 1200 may include other components that may or may not be physically and electrically coupled to the mother board. These other components include, but are not limited to, volatile memory 1288 (e.g., dynamic random-access memory (DRAM)), non-volatile memory 1290 (e.g., read only memory (ROM)), flash memory, a graphics processor 1292, a digital signal processor, a crypto processor, a chipset 1294, a battery 1296, an audio codec, a video codec, a power amplifier 1298, a global positioning system (GPS) device 1273, a compass 1275, an accelerometer, a gyroscope, a speaker 1277, a camera 1279, an antenna 1281, and a mass storage device (such as hard disk drive, compact disk (CD), digital versatile disk (DVD), and so forth).

The system 1200 may include a display device 1283, such as, for example, a cathode ray tube (CRT), liquid crystal display (LCD), light emitting diode (LED), or other suitable display device. The display device 1234 may be a touch screen display supporting touch screen features, and in various one of these embodiments, the I/O complex 1206 may include a touchscreen controller. In various embodiments, the display device 1283 may be a peripheral device interconnected with the system 1200. In various ones of these embodiments, the display device 1283 may be a peripheral device interconnected with the system 1200 by an embodiment of the active optical cable assemblies described herein.

The following paragraphs describe various embodiments.

In various embodiments, an apparatus for transmitting and receiving optical signals may comprise a fiber holder assembly configured to constrain motion of the optical fiber. In various embodiments, the fiber holder assembly may include a fiber holder on a first side of the substrate and a fiber holder cover on a second side of the substrate such that the optical fiber is fixedly held between the fiber holder and the fiber holder cover. In various embodiments, the apparatus for transmitting and receiving optical signals may further comprise a light engine mounted on a substrate and a jumper mounted on the substrate and configured to convey optical signals between an optical fiber and the light engine.

In various embodiments, the apparatus for transmitting and receiving optical signals may comprise an optical cable including the optical cable and a cable jacket surrounding a portion of the optical fiber. In various embodiments, the apparatus may include a jacket support tube having a first end nested within an end of the cable jacket and a second end with a diameter greater than a diameter of an interior of the cable jacket, and a plug cap encircling the jacket support tube such that the end of the cable jacket is between the jacket support tube and the plug cap. In various embodiments, the second end of the jacket support tube may protrude from the end of the cable jacket. In various embodiments, the plug cap may be crimped to fixedly hold the cable jacket against the jacket support tube.

In various embodiments, the apparatus for transmitting and receiving optical signals may comprise a laser diode to generate optical signals, a photodiode to receive optical signals, and an optical integrated circuit to control the laser diode and the photodiode. In various embodiments, the laser diode comprises a vertical-cavity surface-emitting laser (VCSEL).

In various embodiments, the light engine may be configured to transmit and receive optical signals of a plurality of different communication protocols.

In various embodiments, the apparatus for transmitting and receiving optical signals may comprise a lens mounted on the substrate to focus received optical signals onto the light engine. In various embodiments, the apparatus for transmitting and receiving optical signals may further comprise a latch coupling the lens with the jumper.

In various embodiments, the apparatus for transmitting and receiving optical signals may further comprise a boot at least partially enclosing the substrate, the jumper, and the fiber holder assembly.

In various embodiments, the apparatus for transmitting and receiving optical signals may comprise a connector housing coupled with the substrate to provide a physical connection interface to a mating connector port external to the apparatus.

All optional features of the apparatus described above may also be implemented in various apparatuses and various systems. For example, in various embodiments, a system for transmitting and receiving optical signals may comprise an embodiment of the connector plug described above, a network interface configured to communicatively couple the system with a network, and an optical assembly operatively coupled with the network interface, to provide an optical I/O interface and to actively generate and receive optical signals.

In various embodiments, the connector plug may be operatively coupled with the optical assembly.

In various embodiments, the system may comprise an I/O interconnect configured to transport packets of a first protocol to the optical assembly and packets of a second protocol to the optical assembly, wherein the first protocol is different from the second protocol.

In various embodiments, the system may comprise a processor operatively coupled with the optical assembly and the network interface.

In various embodiments, the system may comprise a display device operatively coupled with the optical assembly and the network interface. In various ones of these embodiments, the display device may be a touch screen.

In various embodiments, the system may be a selected one of a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video recorder.

All optional features of the apparatus and system described above may also be implemented with respect to a method or process described herein. For example, in various embodiments, a method for transmitting and receiving optical signals may comprise providing an optical signal from an optical fiber constrained between a fiber holder and a fiber holder cover of an optical connector plug to a light engine mounted on a substrate of the optical connector plug, and converting, by the light engine, the optical signal to an electrical signal.

In various embodiments, the method may include providing the optical signal comprises providing the optical signal from an optical assembly of a host device to the connector plug via the optical fiber.

In various embodiments, the method may include transporting, by an I/O interconnect of the host device, packets of a first protocol to the optical assembly and packets of a second protocol to the optical assembly, and conveying the packets of the first protocol and the packets of the second protocol from the optical assembly to the connector plug via the optical signal.

In various embodiments, the optical signal may be a first optical signal and the electrical signal may be a first electrical signal, and the method may further comprise receiving, by the substrate, a second electrical signal from a device coupled with the connector plug, converting, by the light engine, the second electrical signal to a second optical signal, and conveying, by the optical fiber, the second optical signal to an optical assembly of a host device. In various embodiments, the converting the second electrical signal to a second optical signal may be performed by a laser diode of the light engine. In various embodiments, the converting the first optical signal to the first electrical signal may be performed by a photodiode of the light engine. In various embodiments, the method may comprise controlling the laser diode and the photodiode by an optical integrated circuit of the light engine.

In various embodiments, the optical fiber may be partially surrounded by a cable jacket, and the method may further comprise nesting a first end of a jacket support tube within an end of the cable jacket, and encircling the jacket support tube by a plug cap such that the end of the cable jacket is between the jacket support tube and the plug cap. In various embodiments, a second end of the jacket support tube may have a diameter greater than a diameter of an interior of the cable jacket such that the second end protrudes from the end of the cable jacket. In various embodiments, the method may comprise crimping the plug cap to fixedly hold the cable jacket against the jacket support tube.

In various embodiments, the method comprises focusing the optical signal onto the light engine using a lens mounted on the substrate.

In various embodiments, the providing the optical signal may be performed by a jumper of the optical connector plug.

Various aspects of the illustrative implementations are described herein using terms commonly employed by those skilled in the art to convey the substance of their work to others skilled in the art. It will be apparent to those skilled in the art, however, that embodiments of the present invention may be practiced with only some of the described aspects. For purposes of explanation, specific numbers, materials and configurations are set forth in order to provide a thorough understanding of the illustrative implementations. It will be apparent to one skilled in the art, however, that embodiments of the present invention may be practiced without the specific details. In other instances, well-known features are omitted or simplified in order not to obscure the illustrative implementations.

Flow diagrams illustrated herein provide examples of sequences of various process actions, which may be performed by processing logic that may include hardware, software, or a combination. Further, various operations are described as multiple discrete operations, in turn, in a manner that is most helpful in understanding the illustrative embodiments; however, the order of description should not be construed as to imply that these operations are necessarily order dependent. Thus, the illustrated implementations should be understood only as examples, and the processes can be performed in a different order, and some actions may be performed in parallel, unless specified otherwise. Moreover, methods within the scope of this disclosure may include more or fewer steps than those described.

The phrase "in some embodiments" and "in various embodiments" are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although various example methods, apparatuses, and systems have been described herein, the scope of coverage of the present disclosure is not limited thereto. On the contrary, the present disclosure covers all methods, apparatus, systems, and articles of manufacture fairly falling within the scope of the appended claims, which are to be construed in accordance with established doctrines of claim interpretation. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. An apparatus, comprising:
   a light engine mounted on a substrate;

an optical cable to be coupled with the light engine, wherein the optical cable includes an optical fiber and a cable jacket of a substantially tubular shape surrounding at least a first portion of the optical fiber, wherein the substantially tubular shape of the optical cable extends continuously and free of breaks or gaps throughout a length of the optical cable;

a jumper mounted on the substrate and configured to convey optical signals between the optical fiber and the light engine;

a fiber holder assembly configured to constrain motion of a second portion of the optical fiber that protrudes from the cable jacket, the fiber holder assembly including a fiber holder on a first side of the substrate and a fiber holder cover on a second side of the substrate such that the second portion of the optical fiber is fixedly held between the fiber holder and the fiber holder cover;

a jacket support tube having a first end with a diameter that is less than a diameter of an interior of the cable jacket, and a second end with a diameter greater than the diameter of the interior of the cable jacket, wherein the diameters of the first and second ends are to be measured across an outer surface of the jacket support tube around the first and second ends respectively, wherein the outer surface of the jacket support tube comprises a substantially tubular shape that extends continuously and free of breaks or gaps throughout a length of the jacket support tube from the first end to the second end of the jacket support tube, wherein the first end of the jacket support tube is to fit inside at least an end of the cable jacket, wherein the second end of the jacket support tube is to protrude from inside the end of the cable jacket; and a plug cap to facilitate coupling of the optical cable with the apparatus, wherein the plug cap is to encircle the jacket support tube and is to be crimped to fixedly hold the cable jacket against the jacket support tube, wherein the end of the cable jacket is to be fixed between the jacket support tube and the plug cap.

2. The apparatus of claim 1, wherein the light engine comprises a laser diode to generate optical signals, a photodiode to receive optical signals, and an optical integrated circuit to control the laser diode and the photodiode.

3. The apparatus of claim 1, wherein the light engine is configured to transmit and receive optical signals of a plurality of different communication protocols.

4. The apparatus of claim 1, further comprising a lens mounted on the substrate to focus received optical signals onto the light engine, and a latch coupling the lens with the jumper.

5. The apparatus of claim 1, further comprising a boot at least partially enclosing the substrate, the jumper, the fiber holder assembly, and a connector housing coupled with the substrate to provide a physical connection interface to a mating connector port external to the apparatus.

6. A system, comprising:

a network interface configured to communicatively couple the system with a network;

an optical assembly operatively coupled with the network interface, to provide an optical input/output (I/O) interface and to actively generate and receive optical signals;

an optical cable coupled with the optical assembly, wherein the optical cable includes an optical fiber and a cable jacket of a substantially tubular shape surrounding at least a first portion of the optical fiber, wherein the substantially tubular shape of the optical cable extends continuously and free of breaks or gaps throughout a length of the optical cable; and an optical connector plug operatively coupled with the optical assembly and including:
a light engine mounted on a substrate;
a jumper mounted on the substrate and configured to convey optical signals between the light engine and the optical cable coupled with the optical assembly;

a fiber holder assembly configured to constrain motion of a second portion of the optical fiber that protrudes from the cable jacket, the fiber holder assembly including a fiber holder on a first side of the substrate and a fiber holder cover on a second side of the substrate such that the second portion of the optical fiber is fixedly held between the fiber holder and the fiber holder cover;

a jacket support tube having a first end with a diameter that is less than a diameter of an interior of the cable jacket and a second end with a diameter greater than the diameter of the interior of the cable jacket, wherein the diameters of the first and second ends are to be measured across an outer surface of the jacket support tube around the first and second ends respectively, wherein the outer surface of the jacket support tube comprises a substantially tubular shape that extends continuously and free of breaks or gaps throughout a length of the jacket support tube from the first end to the second end of the jacket support tube, wherein the first end of the jacket support tube is fit inside at least an end of the cable jacket, and the second end of the jacket support tube protrudes from inside the end of cable jacket; and a plug cap to facilitate coupling of the optical cable with the apparatus, wherein the plug cap encircles the jacket support tube and is crimped to fixedly hold the cable jacket against the jacket support tube, wherein the end of the cable jacket is fixed between the jacket support tube and the plug cap.

7. The system of claim 6, further comprising an I/O interconnect configured to transport packets of a first protocol to the optical assembly and packets of a second protocol to the optical assembly, wherein the first protocol is different from the second protocol.

8. The system of claim 6, further comprising a processor operatively coupled with the optical assembly and the network interface, and a display device operatively coupled with the optical assembly and the network interface, and wherein the display device is a touch screen.

9. The system of claim 6, wherein the system is a selected one of a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video recorder.

10. A method comprising:

providing an optical signal from an optical cable to a light engine coupled with the optical cable, the optical cable including a an optical fiber and a cable jacket of a substantially tubular shape surrounding at least a first portion of the optical fiber, wherein the substantially tubular shape of the optical cable extends continuously and free of breaks or gaps throughout a length of the optical cable, with a second portion of the optical fiber protruding from the optical cable and constrained between a fiber holder and a fiber holder cover of an optical connector plug, wherein the light engine is mounted on a substrate of the optical connector plug coupling the optical cable with the light engine by:

a jacket support tube having a first end with a diameter that is less than a diameter of an interior of the cable jacket and a second end with a diameter greater than the diameter of the interior of the cable jacket, wherein the diameters of the first and second ends are to be measured across an outer surface of the jacket support tube around the first and second ends respectively, the outer surface of the jacket support tube having a substantially tubular shape that extends continuously and free of breaks or gaps throughout a length of the jacket support tube from the first end to the second end of the jacket support tube, the first end of the jacket support tube fitting inside at least an end of the cable jacket, the second end of the jacket support tube protruding from inside the end of cable jacket; and a plug cap to facilitate coupling of the optical cable with an apparatus, the plug cap encircling the jacket support tube and crimped to fixedly hold the cable jacket against the jacket support tube, wherein the end of the cable jacket is fixed between the jacket support tube and the plug cap; and converting, by the light engine, the optical signal to an electrical signal.

11. The method of claim 10, wherein the providing the optical signal comprises providing the optical signal from an optical assembly of a host device to the optical connector plug via the optical fiber.

12. The method of claim 11, further comprising transporting, by an I/O interconnect of the host device, packets of a first protocol to the optical assembly and packets of a second protocol to the optical assembly, and conveying the packets of the first protocol and the packets of the second protocol from the optical assembly to the connector plug via the optical signal.

13. The method of claim 11, wherein the optical signal is a first optical signal and the electrical signal is a first electrical signal, and wherein the method further comprises:

receiving, by the substrate, a second electrical signal from a device coupled with the connector plug;

converting, by the light engine, the second electrical signal to a second optical signal; and conveying, by the optical fiber, the second optical signal to the optical assembly of the host device.

14. The method of claim 13, wherein the converting the second electrical signal to a second optical signal is performed by a laser diode of the light engine, and wherein the converting the first optical signal to the first electrical signal is performed by a photodiode of the light engine.

15. The method of claim 14, further comprising controlling the laser diode and the photodiode by an optical integrated circuit of the light engine.

* * * * *

UNITED STATES PATENT AND TRADEMARK OFFICE
CERTIFICATE OF CORRECTION

| | | |
|---|---|---|
| PATENT NO. | : 9,575,269 B2 | Page 1 of 1 |
| APPLICATION NO. | : 13/846302 | |
| DATED | : February 21, 2017 | |
| INVENTOR(S) | : Chun Chit Lam et al. | |

It is certified that error appears in the above-identified patent and that said Letters Patent is hereby corrected as shown below:

In the Claims

Column 16
Line 59, "...a an optical..." should read – "...an optical..."

Signed and Sealed this
Fifteenth Day of May, 2018

Andrei Iancu
*Director of the United States Patent and Trademark Office*